United States Patent
Wang et al.

(10) Patent No.: US 8,310,549 B2
(45) Date of Patent: Nov. 13, 2012

(54) METHOD OF AUTOMATICALLY CALIBRATING A VISUAL PARAMETER FOR AN IMAGING DEVICE

(75) Inventors: Chih-Yuan Wang, Taipei (TW); Cheng-Chang Wu, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 345 days.

(21) Appl. No.: 12/768,613

(22) Filed: Apr. 27, 2010

(65) Prior Publication Data

US 2011/0261208 A1    Oct. 27, 2011

(51) Int. Cl.
*H04N 17/00* (2006.01)
(52) U.S. Cl. ...................................................... 348/187
(58) Field of Classification Search .................. 348/187, 348/189, 180, 175, 272, 345, 349, 353, 294; 396/104, 127
See application file for complete search history.

(56) References Cited

U.S. PATENT DOCUMENTS

| | | | | |
|---|---|---|---|---|
| 5,193,124 A | * | 3/1993 | Subbarao | 382/255 |
| 5,664,234 A | * | 9/1997 | Kawasaki et al. | 396/63 |
| 5,956,528 A | * | 9/1999 | Tanaka | 396/52 |
| 6,094,223 A | * | 7/2000 | Kobayashi | 348/354 |
| 7,158,182 B2 | * | 1/2007 | Watanabe et al. | 348/345 |
| 7,526,192 B2 | * | 4/2009 | Nakahara | 396/104 |
| 7,989,745 B2 | * | 8/2011 | Suzuki | 250/201.2 |
| 2003/0081137 A1 | * | 5/2003 | Yamazaki | 348/354 |
| 2004/0165090 A1 | * | 8/2004 | Ning | 348/272 |
| 2008/0110265 A1 | * | 5/2008 | Wong et al. | 73/627 |
| 2009/0102960 A1 | * | 4/2009 | Tsuchiya | 348/345 |

FOREIGN PATENT DOCUMENTS

| | | |
|---|---|---|
| JP | 05260359 A | 10/1993 |
| JP | 05284414 A | 10/1993 |
| KR | 100126453 B1 | 10/1997 |
| KR | 1020050016181 A | 2/2005 |

* cited by examiner

*Primary Examiner* — Paulos M Natnael
(74) *Attorney, Agent, or Firm* — Stout, Uxa, Buyan & Mullins, LLP

(57) ABSTRACT

A method of automatically calibrating a visual parameter, such as luminance or contrast, for an imaging device is disclosed. A ratio of visual parameter difference to lens position difference between two predetermined lens positions is pre-determined for a predetermined focal length. A target visual parameter is then obtained according to the pre-determined ratio, a current visual parameter and lens position difference between a current lens position and a target lens position. Finally, the current visual parameter is updated by the target visual parameter in an automatic mode.

17 Claims, 8 Drawing Sheets

METHOD OF AUTOMATICALLY CALIBRATING A VISUAL PARAMETER FOR AN IMAGING DEVICE

BACKGROUND OF THE INVENTION

1. Field of the Invention

The present invention generally relates to an imaging device, and more particularly to a method of calibrating luminance and contrast for the imaging device.

2. Description of Related Art

Automatic exposure (AE) and autofocus (AF) have become indispensable to modern cameras and have deterministic influence on resultant capture image. According to AE, the camera can automatically adjust aperture and shutter speed based on light-meter readings. According to AF, the camera can automatically focus the lens based on measuring contrast in a scene.

However, it is observed that luminance or contrast reading value is not constant but varies depending on lens position of the camera. As a result, the automatic exposure or autofocus oftentimes cannot perform as expected.

For the reason that conventional automatic exposure and autofocus in the camera could not effectively capture an image with satisfactory quality, a need has arisen to propose a novel method for calibrating the luminance or contrast readings.

SUMMARY OF THE INVENTION

In view of the foregoing, it is an object of the embodiment of the present invention to provide a method of calibrating a visual parameter such as luminance or contrast for an imaging device in order to improve the accuracy of the automatic exposure or autofocus.

According to one embodiment, a ratio of visual parameter (e.g., luminance or contrast) difference to lens position difference between two predetermined lens positions is pre-determined for a predetermined focal length. According to a specific embodiment, an imaging device is directed at a light source, and is zoomed to the predetermined focal length to be calibrated. The automatic mode (e.g., automatic exposure) is turned off after the automatic mode becomes convergent. The lens is moved to a first lens position x1 and an associated first visual parameter y1 is read at least one time. The lens is then moved to a second lens position x2 and an associated second visual parameter y2 is read at least one time. The ratio m of the visual parameter difference (y2−y1) to the lens position difference (x2−x1) is thus pre-determined. Subsequently, target visual parameter Vt is then obtained according to the pre-determined ratio m, a current visual parameter Vc and lens position difference between a current lens position Pc and a target lens position Pt. According to a specific embodiment, the target visual parameter Vt may be obtained as Vt=Vc−(Pc−Pt)*m. Finally, the current visual parameter is updated by the target visual parameter in an automatic mode.

DETAILED DESCRIPTION OF THE INVENTION

Figures 1, 1A, 1B:
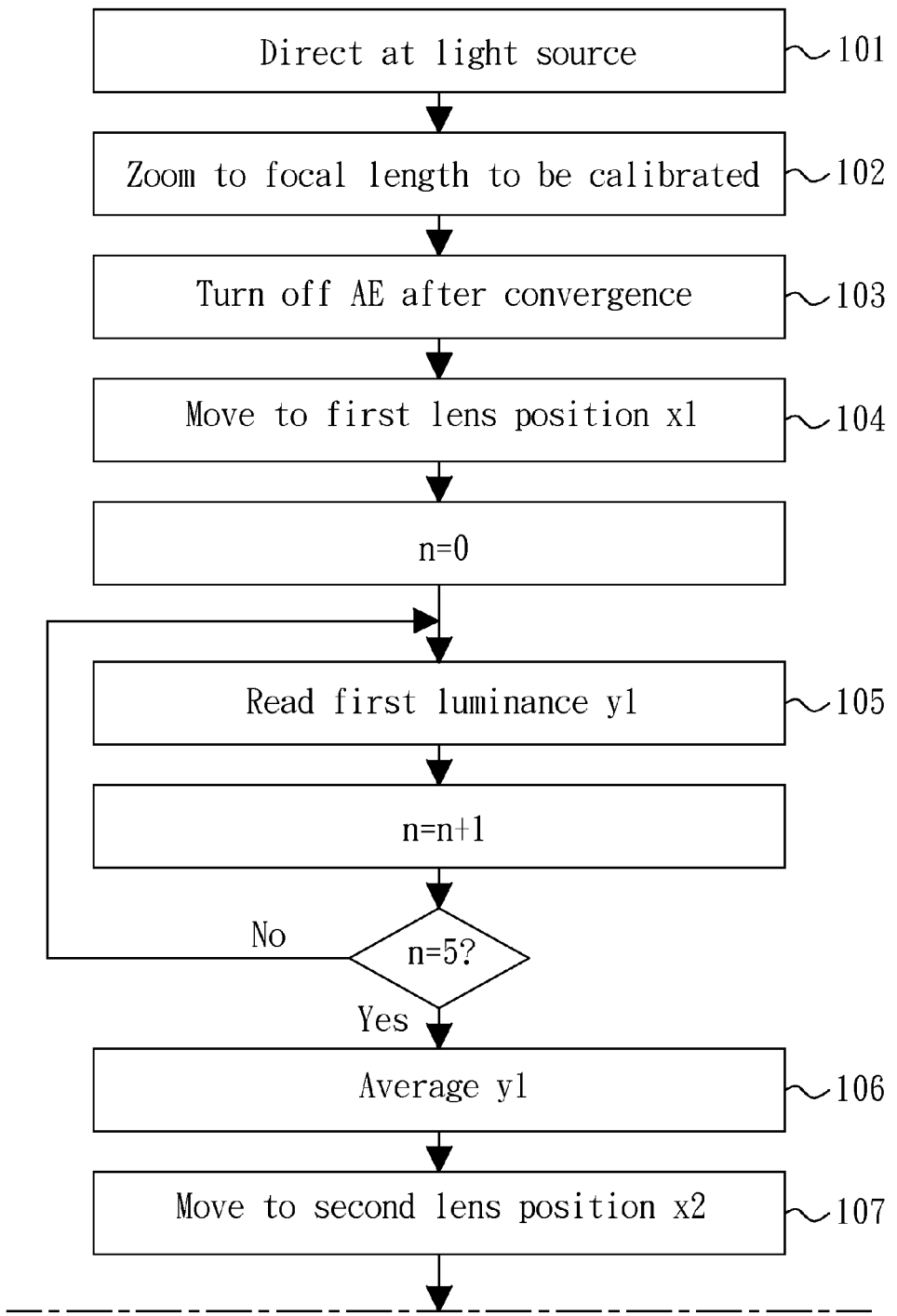
FIG. 1 shows a flow diagram that illustrates a method of automatically calibrating luminance for an imaging device according to a first embodiment of the present invention.
Figure 1B:
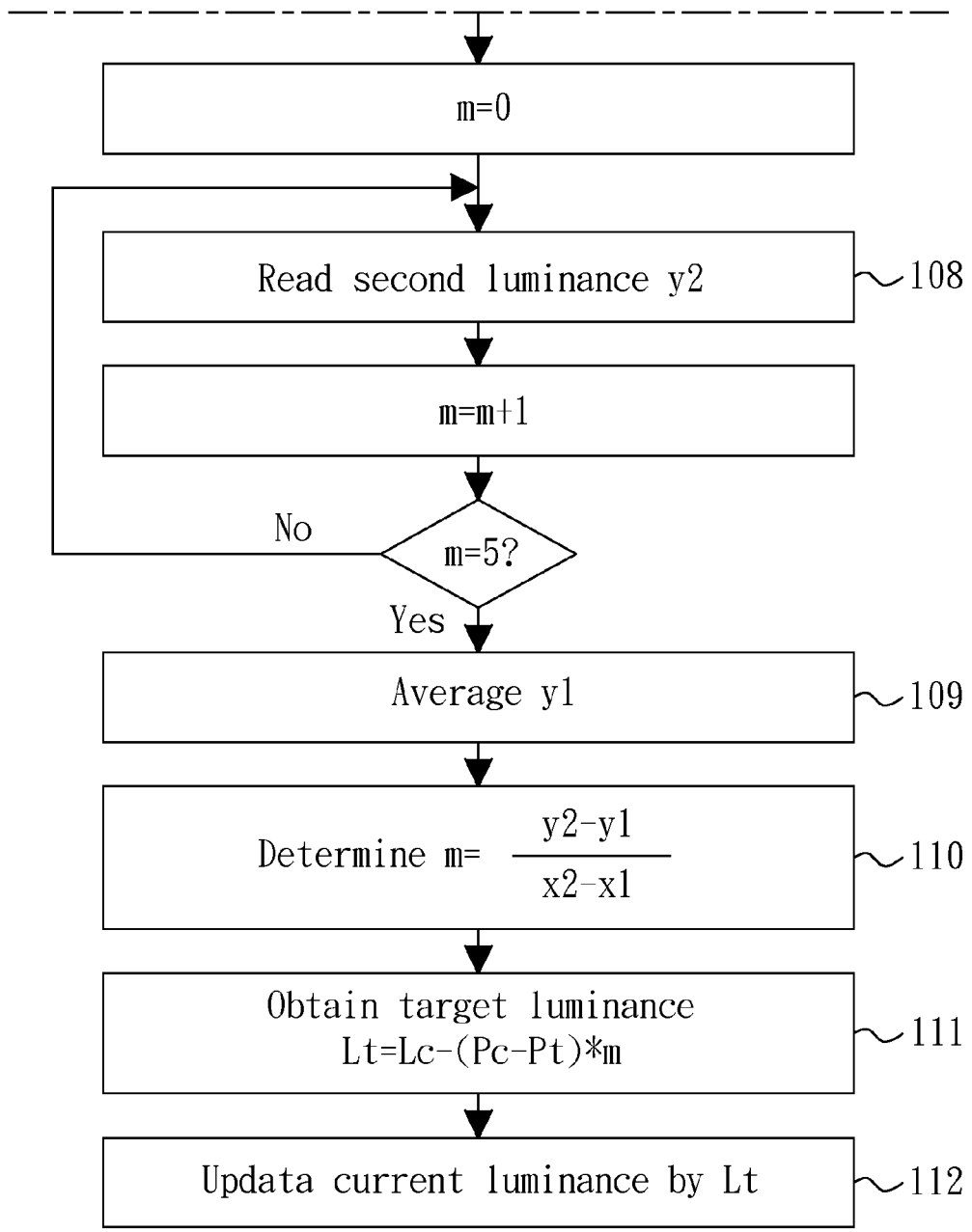

FIG. 1 shows a flow diagram that illustrates a method of automatically calibrating luminance for an imaging device according to a first embodiment of the present invention. The imaging device may be, but not limited to, a digital still camera, a video camera, a mobile phone with a camera or a web camera.

In step 101, the imaging device is directed at a light source (such as a light box) in a manner such that the entire frame of the imaging device is filled with the light source. The imaging device is then zoomed to a predetermined focal length to be calibrated (step 102). Next, in step 103, automatic exposure (AE) mode of the imaging device is turned off after the AE mode becomes convergent or tends to be stable. In step 104, lens of the imaging device is moved to a first lens position x1 (e.g., a position corresponding to infinity focus), and in step 105, an associated first luminance y1 is read from the imaging device. For better reliability, the first luminance y1 is read a number of times, which are then averaged (step 106). Similar to steps 104-106, the lens is moved to a second lens position x2 (e.g., a position corresponding to nearest-end focus) (step 107), and an associated second luminance y2 is read (step 108). For better reliability, the second luminance y2 is read a number of times, which are then averaged (step 109).

Figure 2:
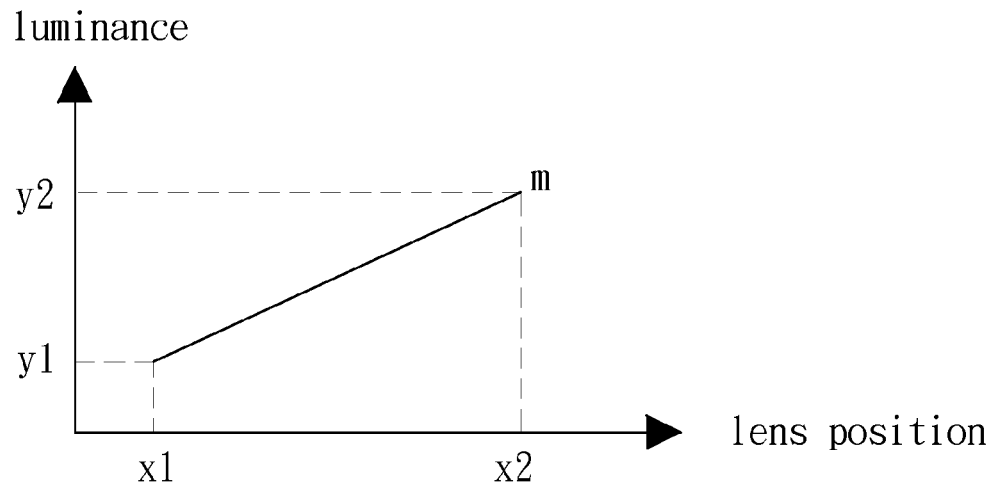
FIG. 2 shows data pairs (x1,y1) and (x2,y2) on a lens-position/luminance diagram.

FIG. 2 shows data pairs (x1,y1) and (x2,y2) on a lens-position/luminance diagram. The slope of the line connecting (x1,y1) and (x2,y2) may be determined, in step 110, by calculating the ratio m of the luminance difference (y2−y1) to the lens position difference (x2−x1), which may be expressed as follows $$m=(y2-y1)/(x2-x1).$$

Afterward, when operating the imaging device, a target luminance Lt is obtained, in step 111, according to the pre-determined ratio (or slope) m, a current luminance Lc, and lens position difference between a current lens position Pc and a target lens position Pt (e.g., a position corresponding to infinity focus). Specifically, the target luminance Lt may be obtained according to the following expression $$Lt=Lc-(Pc-Pt)*m.$$

Figure 3A:
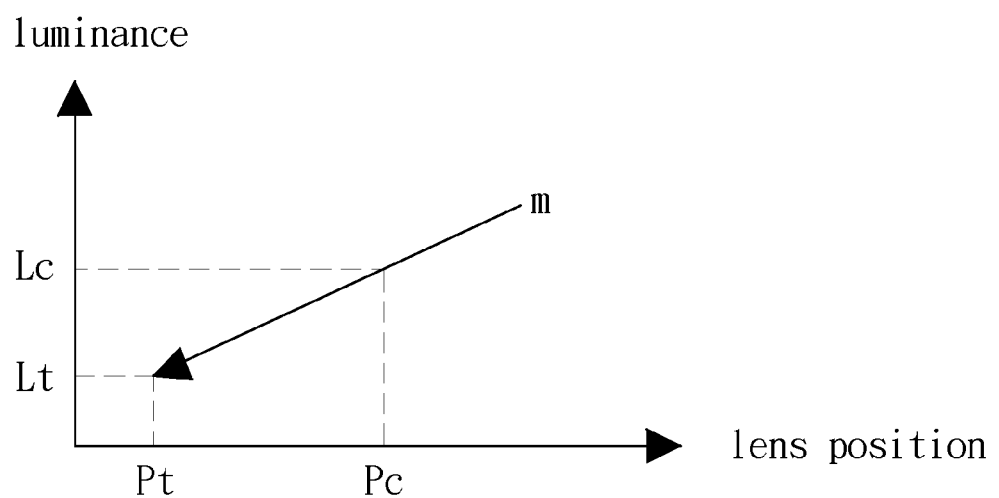
FIG. 3A is a lens-position/luminance diagram showing an obtained target luminance Lt.
Figure 3B:
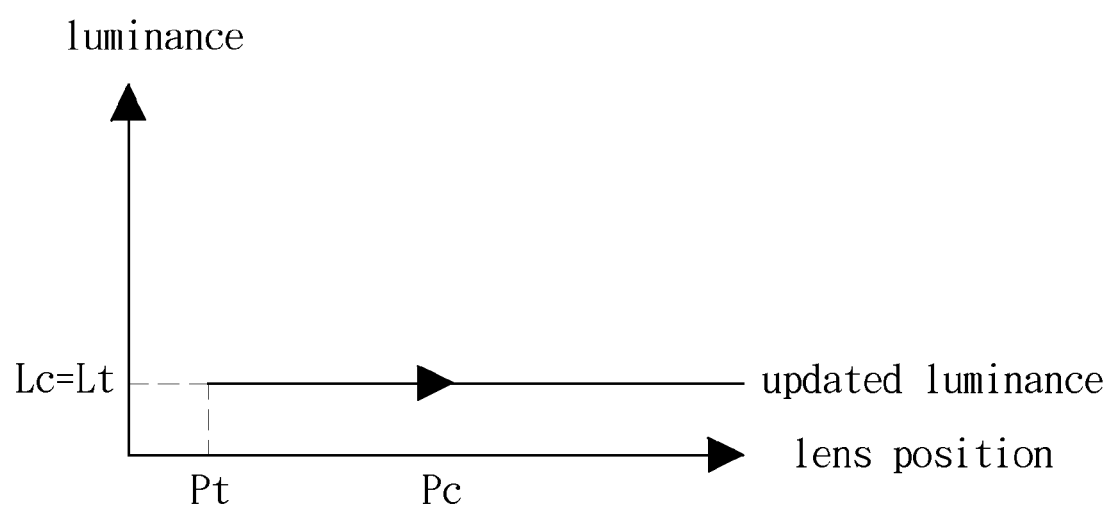
FIG. 3B is a lens-position/luminance diagram showing that current luminance Lc is updated by the obtained target luminance Lt.

FIG. 3A is a lens-position/luminance diagram showing the obtained target luminance Lt. Subsequently, in step 112, the current luminance Lc is then updated by the obtained target luminance Lt in an automatic exposure (AE) mode, as shown in FIG. 3B. Accordingly, luminance will become invariant for various lens positions, and the exposure value received from the automatic exposure system will be stable.

Figures 4, 4A, 4B:
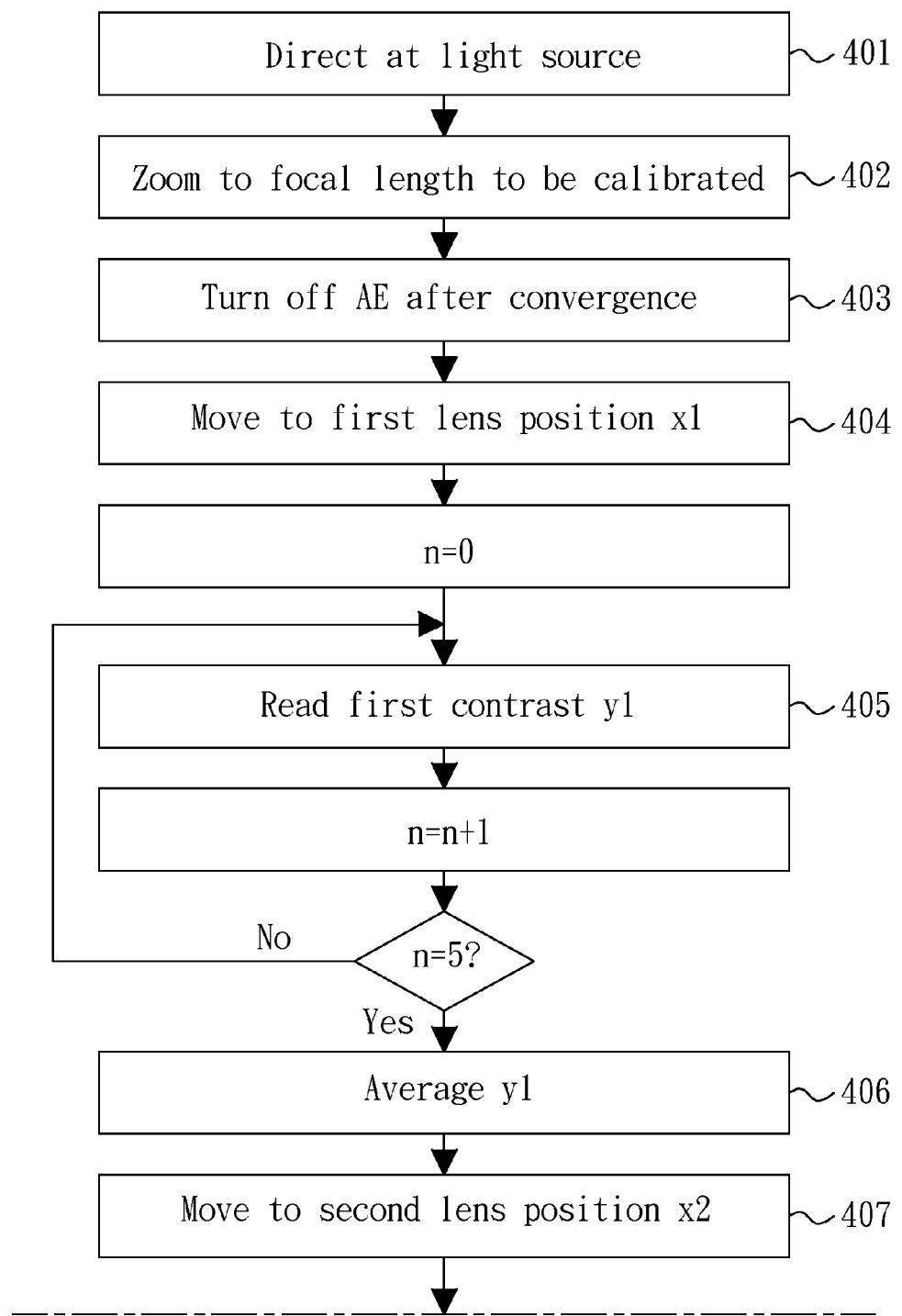
FIG. 4 shows a flow diagram that illustrates a method of automatically calibrating contrast for an imaging device according to a second embodiment of the present invention.
Figure 4B:
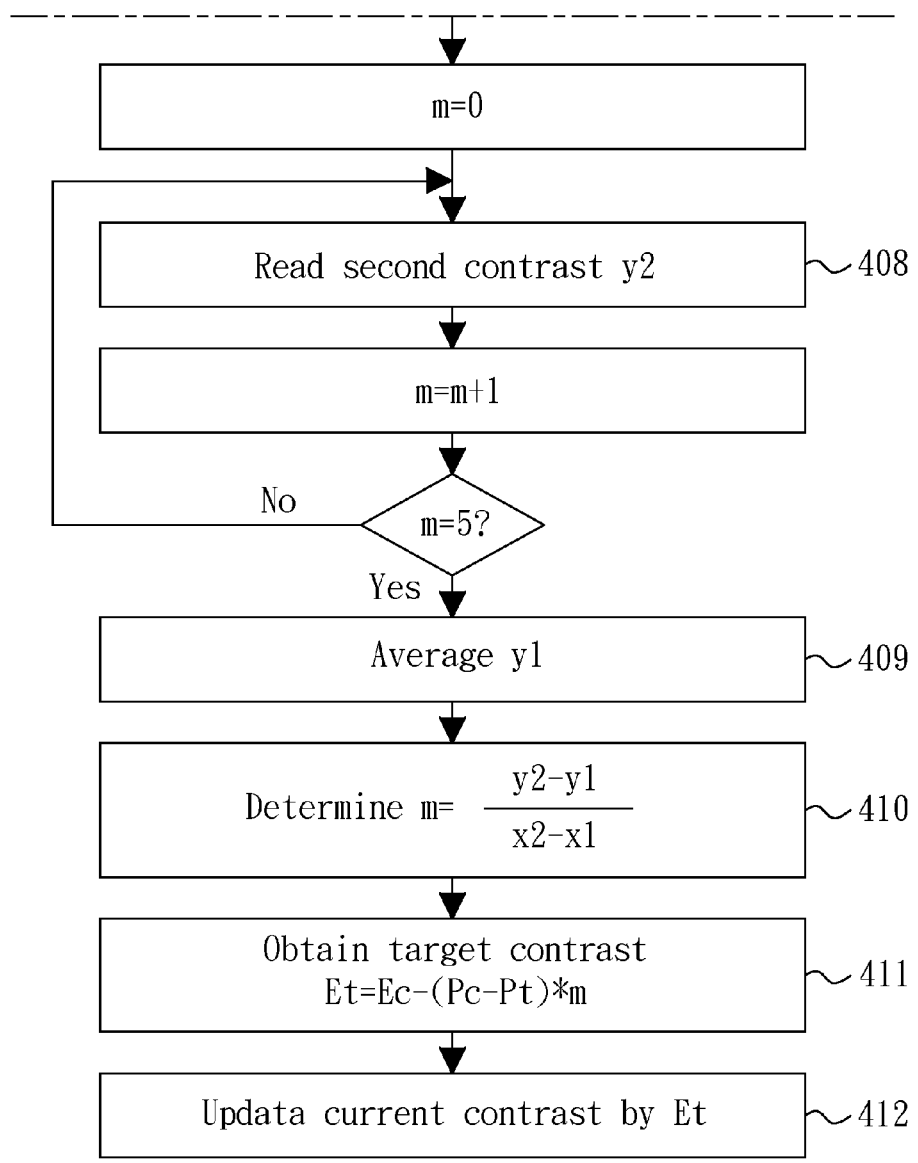

FIG. 4 shows a flow diagram that illustrates a method of automatically calibrating contrast for an imaging device according to a second embodiment of the present invention.

The imaging device may be, but not limited to, a digital still camera, a video camera, a mobile phone with a camera or a web camera.

In step 401, the imaging device is directed at a light source (such as a light box) in a manner such that the entire frame of the imaging device is filled with the light source. The imaging device is then zoomed to a predetermined focal length to be calibrated (step 402). Next, in step 403, automatic exposure (AE) mode of the imaging device is turned off after the AE mode becomes convergent or tends to be stable. In step 404, lens of the imaging device is moved to a first lens position x1 (e.g., a position corresponding to infinity focus), and in step 405, an associated first contrast y1 is read from the imaging device. For better reliability, the first contrast y1 is read a number of times, which are then averaged (step 406). Similar to steps 404-406, the lens is moved to a second lens position x2 (e.g., a position corresponding to nearest-end focus) (step 407), and an associated second contrast y2 is read (step 408). For better reliability, the second contrast y2 is read a number of times, which are then averaged (step 409).

Figure 5:
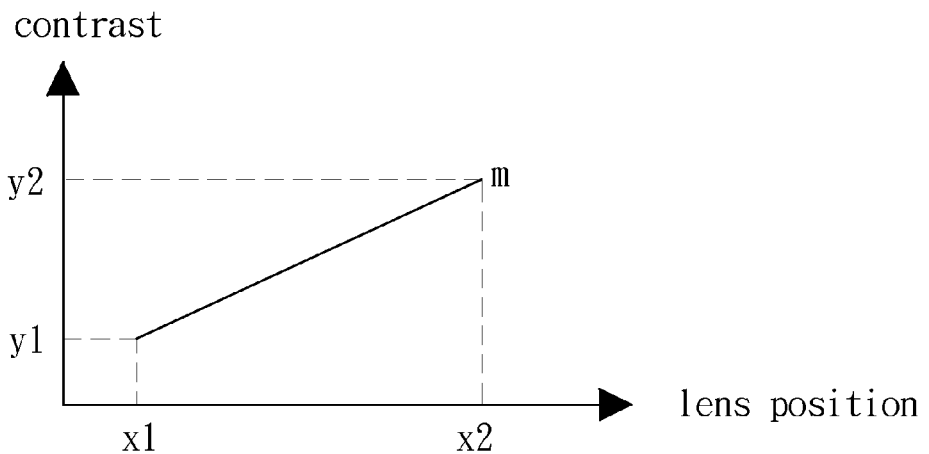
FIG. 5 shows data pairs (x1,y1) and (x2,y2) on a lens-position/contrast diagram.

FIG. 5 shows data pairs (x1,y1) and (x2,y2) on a lens-position/contrast diagram. The slope of the line connecting (x1,y1) and (x2,y2) may be determined, in step 410, by calculating the ratio m of the contrast difference (y2−y1) to the lens position difference (x2−x1), which may be expressed as follows $$m=(y2-y1)/(x2-x1).$$

Afterward, when operating the imaging device, a target contrast Et is obtained, in step 411, according to the pre-determined ratio (or slope) m, a current contrast Ec, and lens position difference between a current lens position Pc and a target lens position Pt (e.g., a position corresponding to infinity focus). Specifically, the target contrast Et may be obtained according to the following expression $$Et=Ec-(Pc-Pt)*m.$$

Figure 6A:
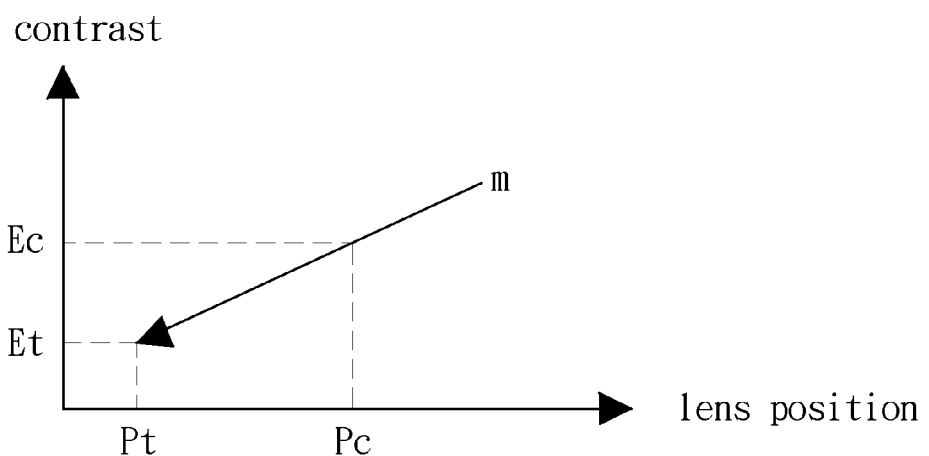
FIG. 6A is a lens-position/contrast diagram showing an obtained target contrast Et.
Figure 6B:
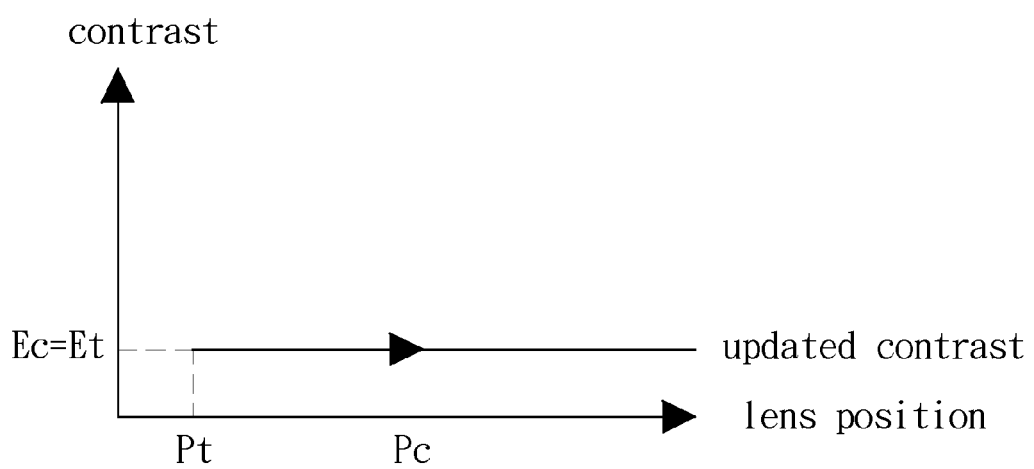
FIG. 6B is a lens-position/contrast diagram showing that current contrast Ec is updated by the obtained target contrast Et.

FIG. 6A is a lens-position/contrast diagram showing the obtained target contrast Et. Subsequently, in step 412, the current contrast Ec is then updated by the obtained target contrast Et in an autofocus (AF) mode, as shown in FIG. 6B. Accordingly, contrast will become invariant for various lens positions, and the contrast value received from the autofocus system will be stable.

According to the embodiments, the accuracy of the automatic exposure and the autofocus may be substantially improved. Although luminance and contrast are illustrated in the first embodiment and the second embodiment respectively, the embodiments may be generally adaptable to calibrating a visual parameter that has a characteristic similar to that shown in FIG. 2 or FIG. 5.

Although specific embodiments have been illustrated and described, it will be appreciated by those skilled in the art that various modifications may be made without departing from the scope of the present invention, which is intended to be limited solely by the appended claims.

What is claimed is:

1. A method of automatically calibrating a visual parameter for an imaging device, comprising:
   pre-determining a ratio of visual parameter difference to lens position difference between two predetermined lens positions for a predetermined focal length;
   obtaining a target visual parameter according to the pre-determined ratio, a current visual parameter and lens position difference between a current lens position and a target lens position; and
   updating the current visual parameter by the target visual parameter in an automatic mode;
   wherein the target visual parameter Vt is obtained according to the pre-determined ratio m, the current visual parameter Vc, and the lens position difference (Pc−Pt) between the current lens position Pc and the target lens position Pt as follows;

$$Vt=Vc-(Pc-Pt)*m.$$

2. The method of claim 1, wherein the step of pre-determining the ratio comprises:
   directing the imaging device at a light source;
   zooming the imaging device to the predetermined focal length to be calibrated;
   turning off the automatic mode after the automatic mode becomes convergent;
   moving the lens to a first lens position x1 and reading an associated first visual parameter y1 at least one time;
   moving the lens to a second lens position x2 and reading an associated second visual parameter y2 at least one time; and
   calculating the ratio m of the visual parameter difference (y2−y1) to the lens position difference (x2−x1).

3. The method of claim 2, wherein the first lens position corresponds to infinity focus and the second lens position corresponds to nearest-end focus.

4. The method of claim 2, wherein the first visual parameter is read a plurality of times and the readings are then averaged.

5. The method of claim 2, wherein the second visual parameter is read a plurality of times and the readings are then averaged.

6. The method of claim 1, wherein the target lens position corresponds to infinity focus.

7. The method of claim 1, wherein the imaging device is one of the following devices: a digital still camera, a video camera, a mobile phone with a camera, and a web camera.

8. A method of automatically calibrating luminance for an imaging device, comprising:
   pre-determining a ratio of luminance difference to lens position difference between two predetermined lens positions for a predetermined focal length;
   obtaining a target luminance according to the pre-determined ratio, a current luminance and lens position difference between a current lens position and a target lens position; and
   updating the current luminance by the target luminance in an automatic exposure mode;
   wherein the target luminance Lt is obtained according to the pre-determined ratio m, the current luminance Lc, and the lens position difference (Pc−Pt) between the current lens position Pc and the target lens position Pt as follows;

$$Lt=Lc-(Pc-Pt)*m.$$

9. The method of claim 8, wherein the step of pre-determining the ratio comprises:
   directing the imaging device at a light source;
   zooming the imaging device to the predetermined focal length to be calibrated;
   turning off the automatic exposure mode after the automatic exposure mode becomes convergent;
   moving the lens to a first lens position x1 and reading an associated first luminance y1 at least one time;
   moving the lens to a second lens position x2 and reading an associated second luminance y2 at least one time; and
   calculating the ratio in of the luminance difference (y2−y1) to the lens position difference (x2−x1).

10. The method of claim 9, wherein the first luminance is read a plurality of times and the readings are then averaged; and the second luminance is read a plurality of times and the readings are then averaged.

11. The method of claim 8, wherein the target lens position corresponds to infinity focus.

12. The method of claim 8, wherein the imaging device is one of the following devices: a digital still camera, a video camera, a mobile phone with a camera, and a web camera.

13. A method of automatically calibrating contrast for an imaging device, comprising:
pre-determining a ratio of contrast difference to lens position difference between two predetermined lens positions for a predetermined focal length;
obtaining a target contrast according to the pre-determined ratio, a current contrast and lens position difference between a current lens position and a target lens position; and
updating the current contrast by the target contrast in an automatic focus mode;
wherein the target contrast Et is obtained according to the pre-determined ratio m, the current contrast Ec, and the lens position difference (Pc−Pt) between the current lens position Pc and the target lens position Pt as follows:

$Et = Ec - (Pc - Pt) * m.$

14. The method of claim 13, wherein the step of pre-determining the ratio comprises:
directing the imaging device at a light source;
zooming the imaging device to the predetermined focal length to be calibrated;
turning off the automatic exposure mode after the automatic exposure mode becomes convergent;
moving the lens to a first lens position x1 and reading an associated first contrast y1 at least one time;
moving the lens to a second lens position x2 and reading an associated second contrast y2 at least one time; and
calculating the ratio m of the contrast difference (y2−y1) to the lens position difference (x2−x1).

15. The method of claim 14, wherein the first contrast is read a plurality of times and the readings are then averaged; and the second contrast is read a plurality of times and the readings are then averaged.

16. The method of claim 13, wherein the target lens position corresponds to infinity focus.

17. The method of claim 13, wherein the imaging device is one of the following devices: a digital still camera, a video camera, a mobile phone with a camera, and a web camera.

* * * * *